Aug. 6, 1963 J. C. SPANNER 3,100,281
APPARATUS FOR MEASURING ANNULAR OFFSET BETWEEN A FIRST
METAL TUBE AND A SECOND METAL TUBE SPATIALLY
DISPOSED WITHIN THE FIRST TUBE
Filed Sept. 28, 1961 3 Sheets-Sheet 1
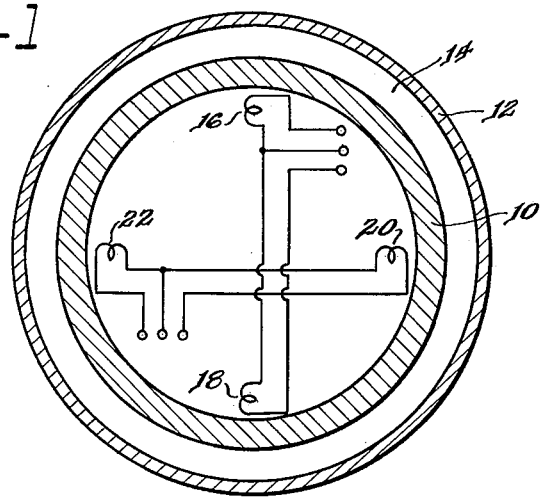
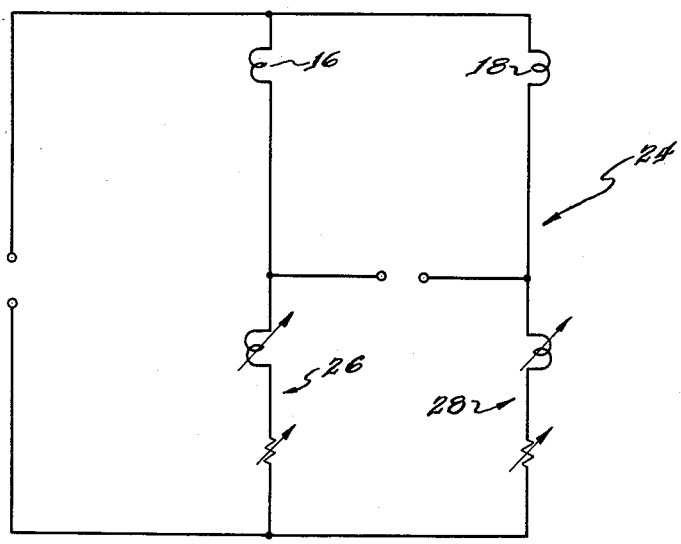
INVENTOR.
Jack C. Spanner
BY
Robert A. Anderson
Attorney

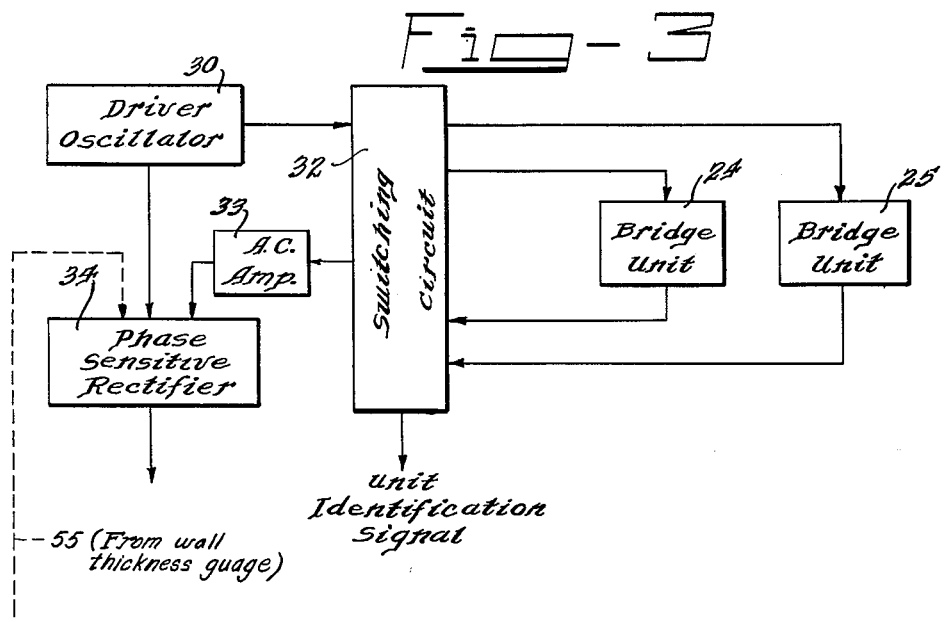
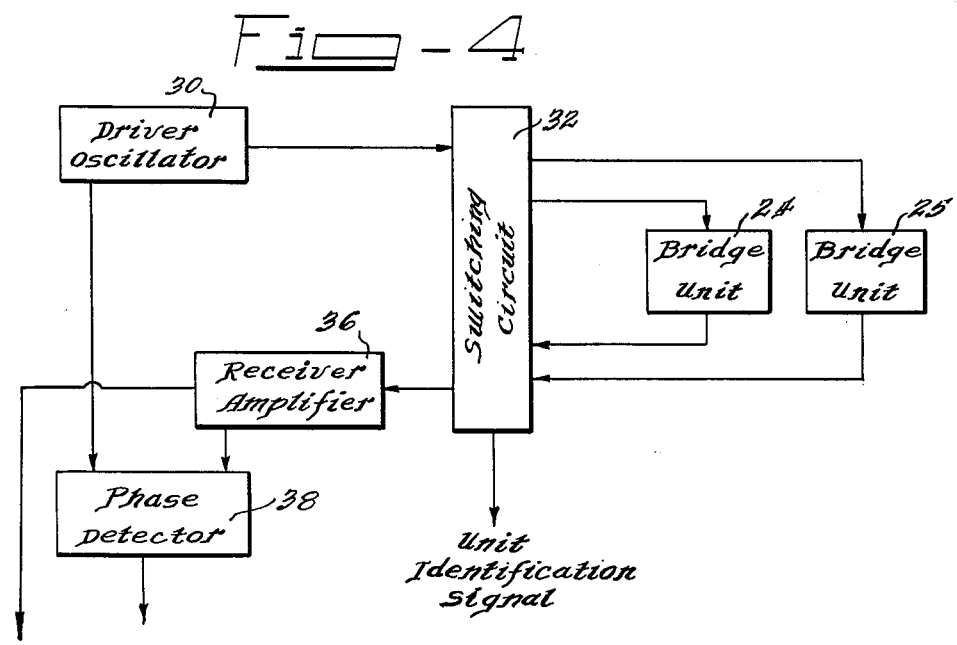

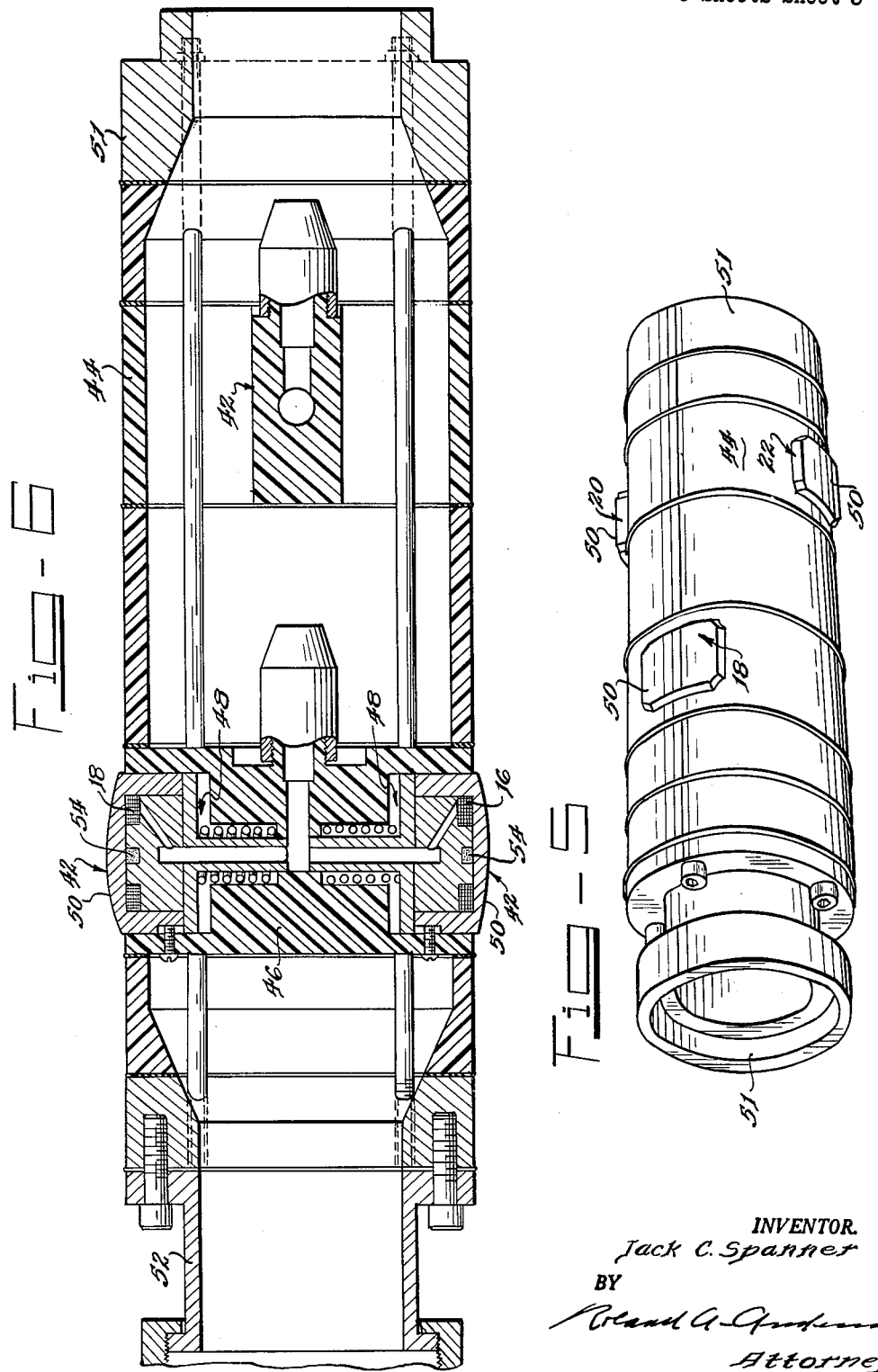

United States Patent Office 3,100,281
Patented Aug. 6, 1963

3,100,281
APPARATUS FOR MEASURING ANNULAR OFFSET BETWEEN A FIRST METAL TUBE AND A SECOND METAL TUBE SPATIALLY DISPOSED WITHIN THE FIRST TUBE
Jack C. Spanner, Richland, Wash., assignor to the United States of America as represented by the United States Atomic Energy Commission
Filed Sept. 28, 1961, Ser. No. 141,552
7 Claims. (Cl. 324—40)

This invention relates to eddy current devices and more specifically to eddy current devices for measuring annular spacing, i.e., the amount of offset between a first metal tube and a second metal tube spatially disposed within the first tube.

Where a tube in tube configuration is being used, the annular spacing between the tubes is quite often a critical factor and has to be measured accurately. Further, physical conditions often dictate that measurements of the annular spacing be made from within the interior of the inner tube. Such a condition is found in the plutonium recycle test reactor which has Zircaloy-2 process tubes mounted within aluminum shroud tubes. These tubes are normally concentrically mounted and it is necessary that any offset in the annular spacing between them be accurately determined. However, the configuration of the reactor necessitates that such measurements be made from within the interior of the Zircaloy-2 process tubes.

It is therefore one object of this invention to provide a device for measuring the amount of offset from concentricity between a first metal tube and a second metal tube spatially disposed concentrically within the first tube.

It is another object of this invention to provide a device for measuring the amount of offset from concentricity, both in value and direction, between a first metal tube and a second metal tube having different resistivity than the first tube and normally spatially disposed concentrically within the first tube.

It is still another object of this invention to provide a device for measuring the amount of offset from concentricity both in value and direction, between a first metal tube and a second metal tube having different resistivity than the first tube and normally spatially disposed concentrically within the first tube, from within the interior of the second tube.

It is also another object of this invention to provide a device for measuring nonsymmetrical changes in offset both in value and direction, between a first metal tube and a second metal tube spatially disposed offset within the first tube, from within the interior of the second tube.

Other objects will become more apparent as the detailed description proceeds.

In general, the present invention comprises a first pair of sensing coils mounted diametrically opposite each other adjacent the interior of the inner tube and a second pair of coils similarly mounted within the interior of the inner tube and displaced 90 degrees from the first coils. Means are provided for alternately applying an A.-C. signal to each pair of sensing coils at a frequency such that the resultant electromagnetic energy from the sensing coils passes through the inner tube and is substantially attenuated within the outer tube. Means are then provided to detect both the magnitude and sense of the differential effective impedances between the sensing coils in each pair, which differential effective impedances are a function of the amount and direction of the annular spacing offset of the two tubes.

More complete understanding of the invention will be best obtained from consideration of the accompanying drawings in which:

FIG. 1 is a schematic diagram showing the sensing coil geometry for the present invention with respect to two normally concentric tubes.

FIG. 2 is a schematic diagram of an impedance bridge unit for the present invention.

FIG. 3 is a block diagram of a preferred embodiment of an apparatus for the present invention.

FIG. 4 is a block diagram of an alternate apparatus for the present invention.

FIG. 5 is a sketch of a probe assembly containing the sensing coils for the present invention.

FIG. 6 is a cross section of the probe assembly shown in FIGURE 5.

In FIGURE 1, a Zircaloy-2 tube 10 is normally concentrically disposed within an aluminum tube 12 so that an annular spacing 14 exists therebetween. A first pair of like inductive sensing coils 16 and 18 are mounted diametrically opposite each other adjacent the interior of inner tube 10. A second pair of inductive sensing coils 20 and 22 identical to coils 16 and 18 are also mounted diametrically opposite each other adjacent the interior of tube 10 and are spatially displaced 90 degrees from the first pair of sensing coils 16 and 18.

Each pair of sensing coils are electrically connected to form impedance arms of a bridge unit as shown in FIGURE 2. Impedance bridge unit 24 is shown for the first pair of sensing coils 16 and 18, and it is to be understood that a similar impedance bridge unit 25 is created for the second pair of sensing coils 20 and 22.

The bridge unit 24 comprises two variable inductive-resistive arms 26 and 28 and two arms formed by sensing coils 16 and 18. The input to the bridge unit 24 is across the common connection of sensing coils 16 and 18 and the common connection of impedance arms 26 and 28. The output from the bridge unit 24 is taken across the common connection of sensing coil 16 and impedance arm 26 and the common connection of sensing coil 18 and impedance arm 28.

Reference is now made to FIGURE 3 to illustrate operation of the present device. A driver oscillator 30 generates an A.-C. signal. A relay-type switching circuit 32 alternately switches the inputs of impedance bridge units 24 and 25 across the output of the driver oscillator 30. Thus, the bridge units 24 and 25 are alternately energized for a given duration of time, which may, for example, be five seconds.

The frequency of the A.-C. signal applied to the impedance bridges 24 and 25 is determined utilizing depth-of-penetration equations. Where the outer tube 12 is located adjacent metallic objects, it is desirable that the excitation frequency be such that attenuation of the electromagnetic energy within the inner tube 10 is sufficiently minimized to permit efficient energy transmission through the inner tube 10 while maintaining essentially total attenuation of energy within the outer tube 12 thereby reducing unwanted effects from the metallic objects. Where the outer tube 12 is relatively isolated from external metallic objects, the desirability of having essentially total attenuation within the outer tube 12 is still present but is not a necessary requirement for the present invention.

Thus, for desirable operating conditions in the transmission of electromagnetic energy in the tubes 10 and 12 shown in FIGURE 1 located adjacent metallic objects, two criteria are required with respect to the frequency of the applied A.-C. signal.

(1) To obtain the required instrument sensitivity, the applied A.-C. signal shall have a frequency such that twice the wall thickness of the inner tube 10 is equal to about one penetration depth for the material of the inner tube 10.

(2) To maintain the required insensitivity to metal objects located outside the outer tube 12, the applied A.-C. signal shall have a frequency such that twice the wall thickness of the outer tube 12 is equal to about three penetration depths for the material of the outer tube 12.

For the Zircaloy-2 and aluminum tubes 10 and 12 having wall thicknesses 0.15" and 0.065" respectively, an A.-C. signal having a frequency of 5 kilocycles is used. At this frequency, the wall thicknesses for the Zircaloy-2 and aluminum tubes 10 and 12 correspond to approximately 1.25 and 2.7 penetration depths for Zircaloy-2 and aluminum respectively and thereby essentially comply with the conditions set forth supra.

Thus, when impedance bridge unit 24 or 25 is energized, the electromagnetic energy transmitted by the sensing coils 16 and 18 or 20 and 22 contained therein is transmitted through the inner tube 10 to the outer tube 12 where it is essentially completely attenuated. The energized sensing coils 16, 18, 20, and 22 can thereby sense the proximity of the outer aluminum tube 12 to each respective coil through the Zircaloy-2 tube 10 wall since the eddy currents induced in the outer tube 12 will vary the effective impedance of the sensing coils 16, 18, 20, and 22 according to the relative distance between each respective sensing coil and the outer tube 12.

The two sensing coils used per impedance bridge unit, connected in this differential manner, give approximately double the sensitivity possible with a single coil and are considerably less affected by symmetrical environmental changes such as temperature, nuclear radiation or scale buildup on the tube walls. Thus, for any variations or disturbances common to both sensing coils, they are substantially self-compensating.

The impedance bridge units 24 and 25 are initially balanced for concentricity between tubes 10 and 12. Thus, for concentric tubes 10 and 12, as each impedance bridge 24 or 25 is energized, any offset in the relative annular spacing 14 between the inner and outer tubes 10 and 12 will produce a change in the effective impedance of the various sensing coils and hence an unbalance in their respective bridge units.

At the same time as the inputs of bridge unit 24 or 25 are switched to driver-oscillator 30, the respective outputs of the energized bridge units 24 or 25 are switched, through an A.-C. amplifier 33, to a phase sensitive rectifier 34 by switching circuit 32. During the five second interval while bridge unit 24 is being energized, the output from the phase sensitive rectifier 34 is a D.-C. voltage whose magnitude is proportional to the amount of offset between inner tube 10 and outer tube 12 in a direction parallel to a line joining coils 16 and 18, and whose polarity is indicative of the sense of offset between the tubes 10 and 12 in this direction. Similarly, during the next five second interval while bridge unit 25 is being energized, the output from the phase sensitive rectifier 34 corresponds in magnitude and polarity to the magnitude and sense of the offset along a line joining coils 20 and 22. A D.-C. unit identification signal is energized through conventional circuitry by switching unit 32 to indicate by its polarity which of the two pairs of coils is being energized during the particular five second period.

It will be understood that the switching unit 32 is provided solely for the purpose of saving on equipment. If desired, each bridge unit 24 or 25 could be continuously energized and the output from each bridge unit 24 or 25 continuously detected by its own phase sensitive rectifier.

Since the four coils 16, 18, 20 and 22 are in quadrature, it will be apparent that the one signal obtained during the energization of bridge unit 24 and the other signal obtained during the energization of bridge unit 25 represent, by their magnitudes and polarities, two 90 degree phase displaced vectors which, when combined vectorially, would produce a vector representing the absolute maximum amount of offset from concentricity in any direction and the direction of such maximum. The two individual signals may be analyzed or combined for this purpose, if desired, by known means.

FIGURE 4 shows essentially the same circuit as FIGURE 3 except that the phase sensitive rectifier 34 and A.-C. amplifier 33 have been replaced by a receiver amplifier 36 and a phase detector 38. The operation of the circuit in FIGURE 4 is the same as in FIGURE 3 with the output from the phase detector 38 indicating by its polarity, the direction of offset between tubes 10 and 12 and the output from the receiver amplifier 36 indicating, by its magnitude, the amount of offset.

For the present device, the sensing coils 16, 18, 20 and 22 may be fixedly positioned within tube 10 to provide quadrature measurement at one point along the tube or means may be provided to permit the sensing coils 16, 18, 20 and 22 to traverse the length of tube 10, with continuous recording of the various signals during the traverse.

FIGURES 5 and 6 illustrate a probe assembly wherein the sensing coils 16, 18, 20 and 22 are held in their proper spatial position to permit their passage along the interior of the inner tube 10 of FIGURE 1. To eliminate misleading indications from moving metal parts, all of the probe assembly near the sensing coils 16, 18, 20 and 22 is made of a nylon-base phenolic. The coil holders 42, however, are made of 304–L stainless steel with chrome-plated bearing surfaces. This is possible since no relative motion exists between the holders 42 and the coils 16, 18, 20, and 22.

As shown in the cross-sectional view of FIGURE 6, the probe assembly is made in eight sections. The two sections 44 and 46, containing coil pairs, are identical except that they are mounted so that the coil pairs are spaced 90 degrees apart. The coil holders 42 and backing plate assemblies 48 are spring loaded to hold the domes 50 of the coil holders 42 in pressure contact with the inner wall of tube 10 as the probe assembly passes therethrough. The probe assembly is held together with four ¼-inch bolts running the full length and serving as ties between the stainless steel and coupling sections 51 and 52.

As the probe assembly of FIGURES 5 and 6 is passed through the inner tube 10, the output signal from the sensing coils 16, 18, 20 and 22 will be affected somewhat by nonsymmetrical wall thickness variations in the inner tube 10. To compensate for any such variations, small crystals 54 may be mounted in the centers of the coil holders 42 of the probe assembly shown in FIGURES 5 and 6. Crystals 54 are of the type used in the ultrasonic art such as quartz crystals which, when excited by electrical signals, generate ultrasonic waves. These crystals 54 coupled to a separate wall thickness gauge (not shown) will give an output signal proportional to the thickness of the inner tube 10 adjacent the sensing coils 16, 18, 20 and 22. The output signal from the wall thickness gauge may then be fed to the phase sensitive rectifier 34 as shown by the dotted arrow 55 in FIGURE 3 to compensate for that portion of the signal from the sensing coils 16, 18, 20 and 22 due to nonsymmetrical wall thickness variations in tube 10.

It is to be understood that the device of the present invention may be applied to other tube in tube configurations wherein the material of the tubes is different than Zircaloy-2 and aluminum. Examples of such other materials are copper and brass for the outer tube 12 and 300 stainless steel and Hasteloy-X for the inner tube 10. The use of such other materials is dependent upon the proper operating frequency for each application. A relatively large resistivity difference between the metals facilitates the measurement. A relatively large resistivity difference between the metals is not a necessary condition for operability of the present invention, but is desirable since the sensitivity of the present invention to annular offset between the inner tube 10 and outer tube 12 is greater with the larger resistivity difference. Also, the higher the resistivity difference of the inner tube 10 with respect to outer tube 12, the less the output of the embodiments of FIGS. 3 and 4 will be influenced by nonsymmetrical variations in the wall thickness of the inner tube 10. Further, the absolute thickness of the inner tube 10 influences the desirability of having a large resistivity difference, i.e., the thinner the wall of the inner tube 10, the less the resistivity difference is required for equivalent sensitivity.

It is also to be understood that it is not a requisite of operation for the present invention that tubes 10 and 12 be normally concentrically mounted; they may also be normally offset. When the tubes 10 and 12 are normally offset, i.e., nonconcentric centers, and the bridges are balanced for such condition, the present device will measure any change in the offset and any nonsymmetrical change in annular spacing. Thus, if the internal diameter of the outer tube 12 were to change nonsymmetrically, the present device would detect this change when the tubes are offset. Except for the established balance point, the operation of the present device is the same whether the tubes 10 and 12 are normally offset or normally concentric with respect to each other.

Persons skilled in the art will, of course, readily adapt the teachings of the invention to embodiments far different than the embodiments illustrated. Though the embodiments illustrated disclose only tube in tube configurations, the principles of the invention may be readily applied to flat metal plates. Accordingly, the scope of the protection afforded the invention should not be limited to the particular embodiments thereof shown in the drawings and described above but shall be determined only in accordance with the appended claims.

What is claimed is:

1. An apparatus for measuring the amount of offset from concentricity between a first metal tube mounted within a second metal tube comprising a plurality of sensing coils disposed within said first tube adjacent the interior surface thereof, means for applying an A.-C. signal having a predetermined frequency to said sensing coils, the frequency of said A.-C. signal being such that the resultant electromagnetic energy from said sensing coils passes through said first tube and is at least partially attenuated by said second tube, and means for differentially measuring the effective impedances of said sensing coils, which differential measurements are a function of the amount of offset between said first and second tubes.

2. An apparatus for measuring the amount of offset between a first metal tube mounted within a second metal tube of different resistivity than said first tube comprising a pair of sensing coils mounted diametrically opposite each other adjacent the interior of said first tube, means for applying an A.-C. signal having a predetermined frequency to said sensing coils, the frequency of said signal being such that the resultant electromagnetic energy from said sensing coils passes through said first tube and is essentially totally attenuated by said second tube, and means for obtaining an algebraic measure of the difference in effective impedance of said coils, which measure corresponds in magnitude and sign with the amount and sense of the offset from concentricity of said tubes along the diameter joining said coils.

3. An apparatus for measuring the amount of offset between a first metal tube mounted within a second metal tube of different resistivity than said first tube comprising a first pair of like sensing coils mounted diametrically opposite each other adjacent the interior of said first tube, a second pair of sensing coils identical to said first pair of coils mounted diametrically opposite each other adjacent the interior surface of said first tube and spatially displaced 90 degrees from said first pair of sensing coils, means for alternately applying an A.-C. signal having a predetermined frequency to each of said pairs of sensing coils, the frequency of said A.-C. signal having a penetration depth in the range between one half the wall thickness of said first tube in the material thereof and one and one half the wall thickness of said second tube in the material thereof, and means for differentially measuring the effective impedance of the sensing coils in each of said pairs, which differential measurements are a function of the amount of offset between said first and second tubes.

4. An apparatus for measuring the amount of offset between a first metal tube mounted within a second metal tube of different resistivity than said first tube comprising a first pair of like sensing coils mounted diametrically opposite each other adjacent the interior of said first tube, a second pair of sensing coils identical to said first pair of coils mounted diametrically opposite each other adjacent the interior surface of said first tube and spatially displaced 90 degrees from said first pair of sensing coils, means for alternately applying an A.-C. signal having a predetermined frequency to each of said pairs of sensing coils, the frequency of said A.-C. signal being such that the resultant electromagnetic energy from said sensing coils passes through said first tube and is essentially totally attenuated by said second tube, and means for differentially measuring the effective impedance of the sensing coils in each of said pairs, which differential measurements are a function of the amount of offset between said first and second tubes.

5. The device according to claim 4 wherein said differential measuring means comprises a first null balancing A.-C. bridge having four impedance arms, each of said first pair of sensing coils forming an adjacent impedance arm of said first A.-C. bridge, the other impedance arms of said A.-C. bridge having variable impedances, the input to said first A.-C. bridge being across one of said first pair of sensing coils and one of said other impedance arms thereof, the output of said first A.-C. bridge being across said first pair of sensing coils, a second null balancing A.-C. bridge having four impedance arms, each of said second pair of sensing coils forming an adjacent arm of said second A.-C. bridge, the other impedance arms of said second A.-C. bridge having variable impedances, the input to said second A.-C. bridge being across one of said second pair of sensing coils and one of said other impedance arms thereof, the output of said second A.-C. bridge being across said second pair of sensing coils, said first and second A.-C. bridges being initially balanced for a predetermined spacing between said first and second tubes and means for measuring the amount of unbalance of said first and second A.-C. bridges, which amount of unbalance is a measure of the amount of offset between said first and second tubes.

6. An apparatus for measuring the annular spacing between a first metal tube mounted offset within a second metal tube of different resistivity than said first tube comprising a first pair of like sensing coils mounted diametrically opposite each other adjacent the interior surface of said first tube, a second pair of sensing coils identical to said first pair of coils mounted diametrically opposite each other adjacent the interior surface of said first tube and spatially displaced 90 degrees from said first pair of sensing coils, a first null balancing A.-C. bridge having four impedance arms, each of said first pair of sensing coils forming an adjacent impedance arm of said first A.-C. bridge, the other impedance arms of said first A.-C. bridge having variable impedances, the input to said first A.-C. bridge being across one of said first pair of sensing coils and one of said other variable impedance arms thereof, the output of said first A.-C. bridge being across said first pair of sensing coils, a second null balancing A.-C. bridge having four impedance arms, each of said second pair of sensing coils forming an adjacent impedance arm of said second A.-C. bridge, the other impedance arms of said second A.-C. bridge having variable impedances, the input to said second A.-C. bridge being across one of said second pair of sensing coils and one of said other variable impedance arms thereof, the output of said second A.-C. bridge being across said second pair of sensing coils, said first and second A.-C. bridges being initially balanced for a predetermined value of annular spacing between said first and second tubes, means for alternately applying an A.-C. signal having a predetermined frequency to the inputs of said first and second A.-C. bridges, the frequency of said A.-C. signal being such that the resultant electromagnetic energy from said sensing coils passes through said first tube and is essentially totally attenuated by said second tube, a phase sensitive rectifier, and means for alternately connecting said phase sensitive rectifier across the outputs of said first and second A.-C. bridges synchronously with the application of said A.-C. signal thereto, the output of said phase sensitive rectifier being a signal whose amplitude is a measure of annular spacing and whose polarity is a measure of the direction of the spacing between said first and second tubes.

7. An apparatus for measuring the annular spacing between a first metal tube mounted within a second metal tube of different resistivity than said first tube comprising a first pair of like sensing coils disposed diametrically opposite each other adjacent the interior of said first tube, a second pair of sensing coils identical to said first pair of coils disposed diametrically opposite each other adjacent the interior of said first tube and spatially displaced 90 degrees from said first pair of sensing coils, means for mounting said coils to permit their movement along the axial length of said first tube while maintaining the fixed spatial relationships between said coils, means for alternately applying an A.-C. signal having a predetermined frequency to each of said pairs of sensing coils, the frequency of said A.-C. signal being such that the resultant electromagnetic energy from said sensing coils passes through said first tube and is essentially totally attenuated by said second tube, means for differentially detecting the output signal from said sensing coils, which differentially detected signal is proportional to the effective impedance of said sensing coils, means for generating a signal proportional to the wall thickness of said first tube adjacent the position of said sensing coils, and means for subtracting said tube wall thickness signal from said detected sensing coil signal such that an output signal is obtained proportional only to the annular spacing between said first and second tubes.

References Cited in the file of this patent

UNITED STATES PATENTS 2,985,824     Renken _____ May 23, 1961

FOREIGN PATENTS 190,289     Austria _____ June 25, 1957